United States Patent [19]
Jenner

[11] Patent Number: 5,878,465
[45] Date of Patent: Mar. 9, 1999

[54] FLEXIBLE CLADDING

[75] Inventor: Detlef Jenner, Altensteig, Germany

[73] Assignee: Zipper-Technik GmbH, Germany

[21] Appl. No.: 973,033

[22] PCT Filed: Mar. 6, 1997

[86] PCT No.: PCT/EP97/01134

§ 371 Date: Nov. 26, 1997

§ 102(e) Date: Nov. 26, 1997

[87] PCT Pub. No.: WO97/37412

PCT Pub. Date: Oct. 9, 1997

[30] Foreign Application Priority Data

Mar. 28, 1996 [DE] Germany ............... 29605749.5

[51] Int. Cl.$^6$ ............................................. B65D 63/00
[52] U.S. Cl. ........................... 24/16 PB; 24/20 CW; 24/20 TT; 24/271; 24/279
[58] Field of Search ................ 24/16 PB, 20 S, 24/20 CW, 20 R, 271, 279, 20 TT, 20 W, 704.1, 456

[56] References Cited

U.S. PATENT DOCUMENTS

| | | | |
|---|---|---|---|
| 931,706 | 8/1909 | Stevens | 24/20 CW |
| 1,349,789 | 8/1920 | Schirra | 24/20 CW |
| 2,440,260 | 4/1948 | Gall | 24/20 CW |
| 3,189,961 | 6/1965 | Heller | 24/20 CW |
| 3,517,702 | 6/1970 | Mueller et al. | 24/16 PB |
| 4,402,113 | 9/1983 | Smith | 24/279 |
| 4,609,171 | 9/1986 | Matsui | 24/16 PB |
| 5,216,783 | 6/1993 | Calmettes et al. | 24/20 CW |

FOREIGN PATENT DOCUMENTS

| | | | |
|---|---|---|---|
| 19519849 | 5/1995 | Germany . | |
| 19522405 | 6/1995 | Germany . | |
| 0954388 | 4/1964 | United Kingdom | 24/271 |

*Primary Examiner*—Victor N. Sakran
*Attorney, Agent, or Firm*—Christie, Parker & Hale, LLP

[57] ABSTRACT

The flexible cladding for encasing cable harnesses or other tubular objects has a track-type casing (10) having longitudinal connecting parts (11, 12). Longitudinal concertina-type formations (24), designed as rounded waves, are positioned between the connecting parts thereby making the flexible cladding highly expansible and ductile.

4 Claims, 1 Drawing Sheet

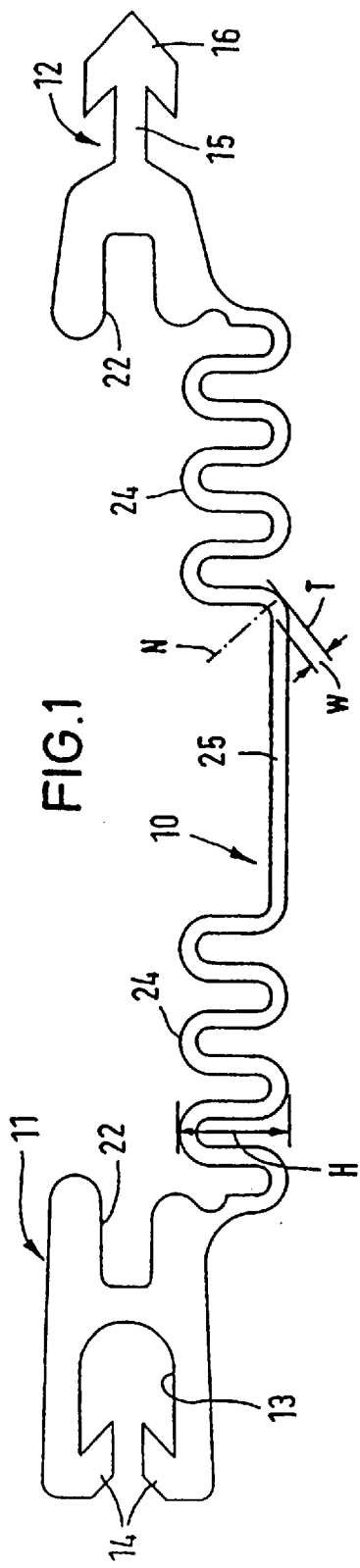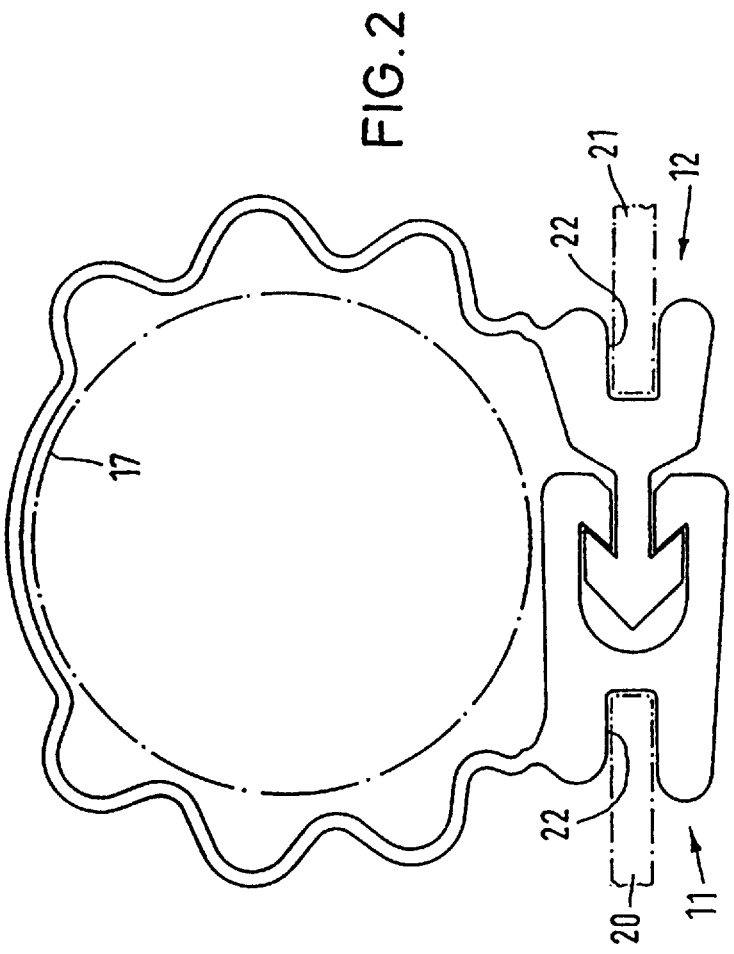

FLEXIBLE CLADDING

The invention relates to a flexible tubular envelope consisting of a web-shaped sheath with longitudinally extending closing members and being provided with longitudinally extending bellows-like folded portions between these closing members.

Such a tubular envelope is known from DE 195 19 849 C1. Such tubular envelopes serve to wrap elongate objects or bundles of objects, for example cable harnesses, pipes or other elements that have to be kept together, e.g. for holding together a pipe sheath of insulating material. This known tubular envelope comprises bellows-like folded portions that allow for a certain circumferential extension of the envelope. For example, bends in the course of the tube require a certain extensibility of the envelope, whereas the wrapped material is to be enclosed tightly in straight sections.

It is an object of the invention to provide a flexible tubular envelope with longitudinally extending bellows-like folded portions which has an improved deformation behavior.

The object is solved, according to the invention, with the features of claim 1.

In the tubular envelope of the present invention, the folded portions are in the form of rounded waves. This is advantageous in that the web-like sheath is extensible in the transverse direction, the folded portions being able to completely regain their shape after tension is applied. With zigzag-like folded portions, as are provided in the tubular envelope of DE 195 19 849 C1, the overall structure of the web-like sheath becomes rigid. The zig-zag folded portions form ridges that do not regain their shape even when strong tensile forces are applied, so the they rather affect the rigidity of the sheath than increase its extensibility, in particular when bent. Due to the change in the cross section of the material related to the zigzag shape and going together with an embossing effect, there is a risk of brittleness under cold conditions.

In contrast thereto, the web-like sheath of the present tubular envelope only has an undulated contour with the wall thickness being maintained, there being no substantial change in the shape of the material cross section. This has the effect that the sheath as a whole is relatively soft and can be placed around objects of different dimensions while snugly enclosing the wrapped object on the outside. This may even mean that the rounded waves are entirely straightened out. When the enclosed object is thinner, however, the rounded waves that tend to contract will remain, the object being enclosed with a certain tension.

The invention is based on the fact that a web-like sheath with formed portions in the shape of rounded waves always has a certain elasticity in the transverse direction (or the circumferential direction), while being soft enough to easily adapt to different diameters of the enclosed material and allowing for a local extension necessary at bends.

Preferably, the formed portions are designed such that the material thickness in the direction of a normal to a tangent line provided to the web in the area of an undulation, is the same in all places. That means that the web of material has a constant thickness and that merely its overall shape has the contour of a corrugated sheet metal.

Preferably, the height of the undulations is more than twice the thickness of the web, and more preferably more than four times the thickness of the web.

A further aspect of such tubular envelopes is the closing of the longitudinally extending closing members. These closing members have their engaging faces formed in the manner of an "arrow and channel" configuration, whereas their averted faces are in the form of trapezoidal grooves into which corresponding pressing tools are inserted.

According to the invention, the grooves provided on the closing members for closing are formed with groove flanks that extend substantially parallel or (even) converge towards the outside. Thus, a much better guiding of the closing tools is guaranteed without there being a risk of the tools slipping out laterally from the grooves.

The following is a detailed description of an embodiment of the invention with reference to the accompanying drawings.

FIG. 1 is a transverse cross sectional view of the tubular envelope lying flat, and FIG. 2 is a transverse cross sectional view of the tubular envelope in the closed state.

The tubular envelope comprises an elongated web-like sheath 10 having each of its longitudinal edges provided with a closing member 11, 12, respectively. One closing member 11 is formed as a "channel", while the closing member 12 is formed as an "arrow". The closing member 11 has a channel 13 defined at the opening by facing hooks 14. In contrast, the closing member 12 is provided with a rib 15 joined by an arrowhead 16. Spreading open the hooks 14, the arrowhead 16 may be inserted into the channel 13 where it is caught and thereby secured against being pulled out, as is illustrated in FIG. 2.

When wrapping a wire harness or another elongate object 17, the sheath 10 is placed around the object and the closing members 11, 12 are then engaged with each other. This is done by means of a closing tool in the form of pliers (not shown) having two rotatable rollers 20, 21 that may be pressed against each other and are moved together in the longitudinal direction of the closing members. For guiding the rollers 20, 21, the outsides of the closing members 11 and 12 are each provided with grooves 22. According to the invention, these grooves have substantially parallel groove flanks, i.e. each groove 22 has a substantially constant width over its depth. Possibly, the grooves may even be undercut or dovetailed with the groove flanks diverging outward. Here, outward refers to the engaged state as in FIG. 2, in which the grooves 22 are facing away from each other. The tubular envelope as a whole is made integrally from plastics material, the closing members 11 and 12 being welded to the edges of the web-like sheath 10 as profiles.

The sheath 10 consists of a sheet with a constant thickness over its entire width. Folded portions 24 in the form of rounded waves are formed in the area of the sheath 10. The height of the undulations is about five times the material thickness of the sheath 10. In the present case two portions of sinusoidal waves are arranged on both sides of a planar intermediate portion 25. The material thickness win the direction of a normal N to a tangent line T to the web 10 is substantially the same at all places. As a result, the sheath 10 is highly extensible, yet relatively soft so that it will adapt from outside to the objects 17 to be enclosed and also be sufficiently expansible when bends occur in the course of the object.

What is claimed is:

1. A tubular envelope comprising:

a sheath sufficiently flexible to be wrapped around an elongated object for encompassing the object;

a longitudinally extending male closing member extending along one edge of the sheath;

a longitudinally extending female closing member extending along the opposite edge of the sheath;

a plurality of longitudinally extending rounded wave-like folds adjacent to each of the closing members;

the male closing member comprises a protruding locking member extending longitudinally along the sheath;

the female closing member comprises a partially complementary locking channel extending longitudinally along the sheath;

the male closing member comprises a tool-engaging groove having parallel or converging flanks opposite the protruding member; and the female closing member comprises a tool-engaging groove having parallel or converging flanks opposite the locking channel for dressing the male closing member into the female closing member.

2. A tubular envelope according to claim 1 wherein the thickness of the material forming the wave-like folds is substantially the same in all places.

3. A tubular envelope according together one of claims 1 or 2 wherein the height of the waves of the wave-like folds is more than twice the sheath thickness.

4. A tubular envelope according to either one of claims 1 or 2 wherein the height of the waves of the wave-like folds is more than four times the sheath thickness.

* * * * *

UNITED STATES PATENT AND TRADEMARK OFFICE
CERTIFICATE OF CORRECTION

PATENT NO. : 5,878,465
DATED : March 9, 1999
INVENTOR(S) : Detlef Jenner

It is certified that error appears in the above-identified patent and that said Letters Patent is hereby corrected as shown below:

Column 2, line 52, replace "thickness win" with -- thickness w in --.
Column 4, line 6, replace "together" with --toeither--.

Signed and Sealed this

Eighth Day of August, 2000

Attest:

Q. TODD DICKINSON

Attesting Officer

Director of Patents and Trademarks